US011610498B2

(12) United States Patent
Rodriguez Bravo

(10) Patent No.: US 11,610,498 B2
(45) Date of Patent: Mar. 21, 2023

(54) VOICE INTERACTIVE PORTABLE COMPUTING DEVICE FOR LEARNING ABOUT PLACES OF INTEREST

(71) Applicant: KYNDRYL, INC., New York, NY (US)

(72) Inventor: Cesar Augusto Rodriguez Bravo, Alajuela (CR)

(73) Assignee: KYNDRYL, INC., New York, NY (US)

( * ) Notice: Subject to any disclaimer, the term of this patent is extended or adjusted under 35 U.S.C. 154(b) by 1112 days.

(21) Appl. No.: 16/202,362

(22) Filed: Nov. 28, 2018

(65) Prior Publication Data

US 2020/0168113 A1    May 28, 2020

(51) Int. Cl.
*G09B 5/00* (2006.01)
*G09B 5/04* (2006.01)
(Continued)

(52) U.S. Cl.
CPC ............ *G09B 5/04* (2013.01); *G06F 40/205* (2020.01); *G06Q 10/02* (2013.01);
(Continued)

(58) Field of Classification Search
CPC ........ G09B 5/04; G06F 40/205; G06F 40/58; G06Q 10/02; G06Q 30/0255; G06V 20/20;
(Continued)

(56) References Cited

U.S. PATENT DOCUMENTS 5,848,373 A    12/1998  Delorme
6,142,784 A    11/2000  Wood
(Continued)

FOREIGN PATENT DOCUMENTS

CN    202855129    4/2013
CN    105169722    12/2015
(Continued)

OTHER PUBLICATIONS

Matt Klein, 26 Actually Useful Things You Can Do with Siri, updated Jul. 10, 2017, How-To Geek, Retrieved from Internet Jul. 20, 221: https://www.howtogeek.com/229308/26-actually-useful-things-you-can-do-with-siri/, 25 pages.
Allyson Kazmucha, How to find movies and showtimes in your area with Siri, Jul. 5, 2014, Retrieved from Internet on Jul. 20, 2021: https://www.imore.com/how-find-movies-and-showtimes-your-area-siri, 8 pages.

(Continued)

*Primary Examiner* — Andrew C Flanders
*Assistant Examiner* — Parker Mayfield
(74) *Attorney, Agent, or Firm* — Tutunjian & Bitetto, P.C.; Erik Swanson

(57) ABSTRACT

A system and method for assisted-learning with a portable computing device that includes converting an audio file into text, parsing the text to determine that a user is requesting information regarding a place of interest, in response to determining that the user is requesting information regarding the place of interest: obtaining a geographical location of the portable computing device, activating a camera of the portable computing device to capture one or more images of a surrounding, analyzing the one or more images using a visual recognition engine in combination with the geographical location to identify the place of interest, determining that an interactive option is available for the place of interest, and instructing the portable computing device to audibly output the interactive option to the user along with information about the place of interest.

17 Claims, 13 Drawing Sheets

(51) Int. Cl.
*G06Q 30/0251* (2023.01)
*G10L 15/22* (2006.01)
*G06Q 10/02* (2012.01)
*G06F 40/205* (2020.01)
*G10L 15/26* (2006.01)
*G06V 20/20* (2022.01)

(52) U.S. Cl.
CPC ......... *G06Q 30/0255* (2013.01); *G06V 20/20* (2022.01); *G10L 15/22* (2013.01); *G10L 15/26* (2013.01)

(58) Field of Classification Search
CPC .... G06V 2201/10; G06V 10/17; G06V 20/00; G06V 40/174; G10L 15/22; G10L 15/26; H04N 5/232
See application file for complete search history.

(56) References Cited

U.S. PATENT DOCUMENTS

| | | |
|---|---|---|
| 6,321,158 B1 | 11/2001 | Delorme |
| 6,882,824 B2 | 4/2005 | Wood |
| 7,029,283 B2 | 4/2006 | Marcus |
| 7,428,994 B1 | 9/2008 | Jeffway, Jr. et al. |
| 7,577,244 B2 | 8/2009 | Taschereau |
| 7,802,724 B1 | 9/2010 | Nohr |
| 8,376,803 B2 | 2/2013 | Oonaka |
| 8,995,716 B1* | 3/2015 | Zomet ............... G06F 16/583 382/103 |
| 9,436,681 B1* | 9/2016 | Tunstall-Pedoe ....... G06F 40/45 |
| 9,814,993 B2 | 11/2017 | Ponomarev et al. |
| 2002/0042713 A1 | 4/2002 | Kim et al. |
| 2002/0091793 A1* | 7/2002 | Sagie .................. G06F 16/9537 709/217 |
| 2004/0219496 A1 | 11/2004 | Stevinson |
| 2007/0174042 A1 | 7/2007 | Thompson |
| 2008/0201227 A1 | 8/2008 | Bakewell |
| 2011/0184949 A1 | 7/2011 | Luo |
| 2012/0179448 A1* | 7/2012 | Gupta ..................... G06F 40/58 455/414.1 |
| 2015/0286873 A1* | 10/2015 | Davis ................... G06F 1/1694 382/103 |
| 2016/0196264 A1* | 7/2016 | Bostick ................. H04N 5/232 707/706 |
| 2016/0292507 A1* | 10/2016 | Ghoson ................. G06V 20/20 |
| 2017/0036116 A1 | 2/2017 | Cohen et al. |

FOREIGN PATENT DOCUMENTS

| | | |
|---|---|---|
| CN | 205928670 | 2/2017 |
| JP | 2000215211 A | 8/2000 |
| WO | WO0169830 | 9/2001 |
| WO | WO2017164825 | 9/2017 |

OTHER PUBLICATIONS

Lory Gil et al., How to find places with Maps and Siri for iPhone and iPad, Apr. 9, 2014, Retrieved from Internet Jul. 20, 2021: https://www.imore.com/how-find-places-maps-and-siri-iphone-and-ipad, 9 pages.

Allyson Kazmucha, How to search for movie theaters in specific areas with Siri, May 9, 2014, Retrieved from Internet Jul. 27, 2021: https://www.imore.com/how-view-all-movie-theaters-specific-area-siri, 6 pages.

Lou Hattersley, Find information with Siri on the iPad or iPhone, Dec. 31, 2013, Retrieved from Internet Jul. 27, 2021: https://www.macworld.co.uk/how-to/iosapps/find-information-sir-ipad-or-iphone-3495150/, 5 pages.

Tyche, True AI (Artificial Intelligence) Companion for Kids, Jan. 17, 2018, Retrieved from Internet: URL: https://www.kickstarter.com/projects/407592806/tyche-the-true-ai-companion-for-kids, 27 pages.

Woobo: The Talking Robot Inspiring Curious Kids to Explore, Jan. 17, 2018, Retrieved from Internet: URL: https://www.kickstarter.com/projects/702843172/woobo-a-smart-companion-for-curious-kids, 41 pages.

Chandra, Vinesh, Teaching and Learning Mathematics With Robotics in Middle-Years of Schooling, Retrieved from Internet: URL: https://eprints.qut.edu.au/39730/, (2010), 2 pages.

Nao Robot Teach Simple Math, Retrieved from Internet: URL: https://www.youtube.com/watch?v=bPrtsFocMoo, RobotLAB Inc., Published on Jun. 28, 2017, 3 pages.

U.S. Appl. No. 16/202,235, filed Nov. 28, 2018, Publication No. US2020016810A1.

Nick Statt, The Leka Smart Toy is a Robot for Children With Developmental Disabilities, Retrieved from Internet: URL: https://www.theverge.com/ces/2017/1/4/14167590/leka-smart-toy-robot-autism-learning-tool-ces-2017, 5 pages.

McReynolds et al., Toys That Listen: A Study of Parents, Children, and Internet-Connected Toys, Retrieved from Internet: URL: https://dl.acm.org/citation.cfm?id=3025735, Proceeding CHI '17 Proceedings of the 2017 CHI Conference on Human Factors in Computing Systems pp. 5197-5207, Denver, Colorado, USA—May 6-11, 2017, ACM New York, NY, USA © 2017, table of contents ISBN: 978-1-4503-4655-9 doi> 10.1145/3025453.3025735.

Amazon, Shop Movie and TV Toys, Amazon.com: CogniToys Dino, Powered by IBM Watson, Kids Cognitiv . . . https://www.amazon.com/CogniToys-Powered-Cognitive-Electronic-Lea . . . ; Jun. 21, 2018, 13 pages.

U.S. Appl. No. 16/202,291, filed Nov. 28, 2018, Publication No. 20200168114.

Mell, Peter et al.; "The NIST Definition of Cloud Computing;" National Institute of Standards and Technology; Special Publication 800-145; Sep. 2011; 7 pages.

Murphy, Jason A.; List of IBM Patents or Patent Applications Treated as Related; May 28, 2021; 1 page.

* cited by examiner

VOICE INTERACTIVE PORTABLE COMPUTING DEVICE FOR LEARNING ABOUT PLACES OF INTEREST

TECHNICAL FIELD

The present invention relates to systems and methods for assisted learning, and more specifically the embodiments of an assisted learning system for learning about places of interest based on a current location.

BACKGROUND

Many children begin learning about places of interest at a young age. Often times, children learn about places of interest selected by conventional sources, such as classes, textbooks, parents, television, and teachers.

SUMMARY

An embodiment of the present invention elates to a method, and associated computer system and computer program product, for assisted learning with a portable computing device. A processor of a computing system converts an audio file received from a portable computing device into text. The text is parsed to determine that a user is requesting information regarding a place of interest. In response to determining that the user is requesting information regarding the place of interest: a geographical location of the portable computing device is obtained, a camera of the portable computing device is activated to capture one or more images of a surrounding of the user, the one or more images are analyzed using a visual recognition engine in combination with the geographical location to identify the place of interest, an interactive option is determined to be available for the place of interest, and the portable computing device is instructed to audibly output the interactive option to the user along with information about the place of interest

DETAILED DESCRIPTION

Figure 1:
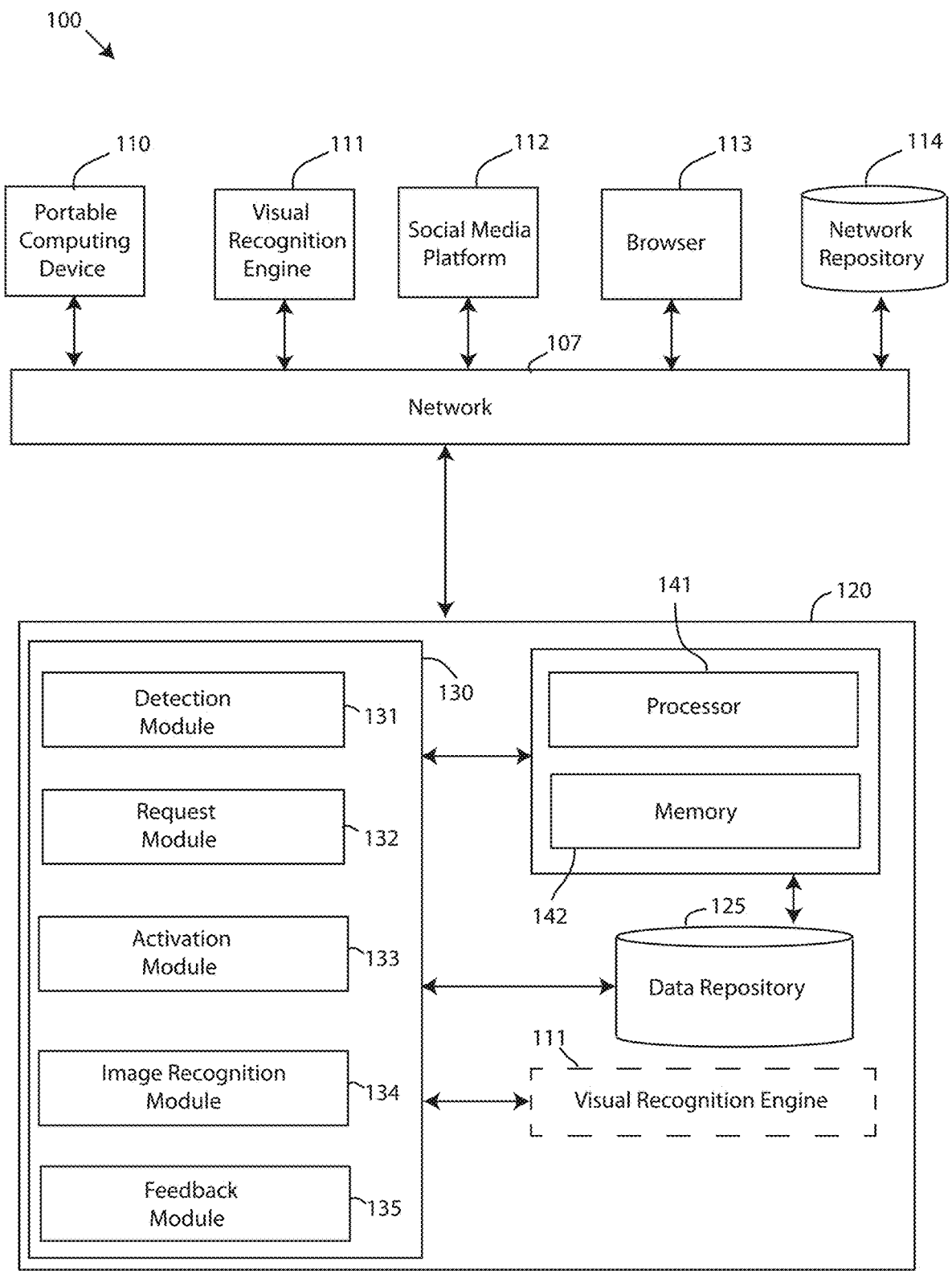
FIG. 1 depicts a block diagram of an assisted learning system, in accordance with embodiments of the present invention.

Referring to the drawings, FIG. 1 depicts a block diagram of an assisted learning system 100, in accordance with embodiments of the present invention. The assisted learning system 100 is a system for learning about places of interest in a varying environment. The assisted learning system 100 may be useful for users, such as children, who are beginning to learn about places of interest located within the user's environment.

Embodiments of the assisted learning system 100 may be alternatively referred to a location learning system, an interactive learning system, a smart assistant system, and the like.

The assisted learning system 100 includes a computing system 120. Embodiments of the computing system 120 include a computer system, a computer, a server, one or more servers, a backend computing system, and the like.

Furthermore, the assisted learning system 100 includes a portable computing device 110, a visual recognition system 111, a social media platform 112, and a browser 113 that are communicatively coupled to the computing system 120 over a network 107. For instance, information/data is transmitted to and/or received from the portable computing device 110, the visual recognition system 111, the social media platform 112, and the browser 113 over a network 107. In an exemplary embodiment, the network 107 is a cloud computing network. Further embodiments of network 107 refer to a group of two or more computer systems linked together. Network 107 includes any type of computer network known by individuals skilled in the art. Examples of network 107 include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. In one embodiment, the architecture of the network 107 is a peer-to-peer, wherein in another embodiment, the network 107 is organized as a client/server architecture.

In an exemplary embodiment, the network 107 further comprises, in addition to the computing system 120, a connection to one or more network-accessible knowledge bases 114, which are network repositories containing information of the user preferences, user game activity, user interest scores, user location, etc., network repositories or other systems connected to the network 107 that are considered nodes of the network 107. In an embodiment there the computing system 120 or network repositories allocate resources to be used by the other nodes of the network 107, the computing system 120 and network-accessible knowledge bases 114 is referred to as servers.

The network-accessible knowledge bases 114 is a data collection area on the network 107 which backs up and save all the data transmitted back and forth between the nodes of the network 107. For example, the network repository is a data center saving and cataloging the users' preferences, user game activity, user interest scores, user location, etc., and the like, to generate both historical and predictive reports regarding a particular user or a particular user learning progress. In an exemplary embodiment, a data collection center housing the network-accessible knowledge bases 114 includes an analytic module capable of analyzing each piece of data being stored by the network-accessible knowledge bases 114. Further, the computing system 120 can be integrated with or as a part of the data collection center housing the network-accessible knowledge bases 114. In an alternative embodiment, the network-accessible knowledge bases 114 are a local repository that is connected to the computing system 120.

The portable computing device 110 is a computing device that can be used by a user, such as a child, in a physical environment. In an exemplary embodiment, the portable computing device 110 is a robot that may support programmable movement. In other embodiments, the portable computing device 110 can be a cell phone, a mobile computing device, a smartphone, a tablet computer, a laptop computer, a wearable computing device, a smartwatch, an internet-connected doll or action figure, and the like. For instance, a portable computing device 110 may be operated by the user to learn about places of interest, structures, landmarks, schools, historical sites, activity centers, retail stores, etc. in an environment shared by the user. The portable computing device 110 can include hardware functionality such as a speaker for emitting a sound, a vibration motor for creating vibrations, a display for displaying images, text, messages, videos, pictorial sequences, etc., a light emitting element for emitting a light, a receiver for receiving communications, a transmitter for transmitting signals, a microphone for capturing real-world audio, and other similar features and hardware of a computer, smartphone, smartwatch, cell phone, tablet computer, and the like.

Figure 2:
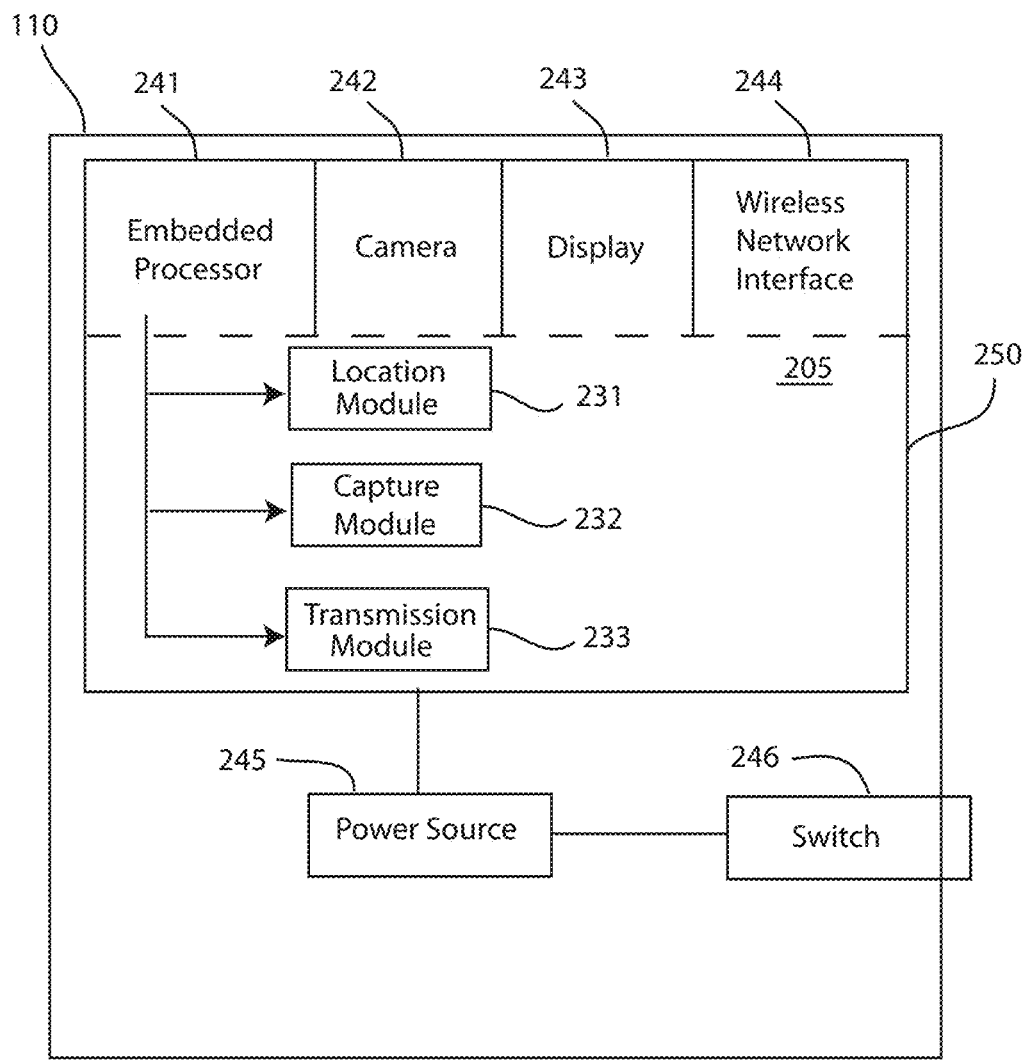
FIG. 2 depicts a block diagram of a portable computing device, in accordance with embodiments of the present invention.

FIG. 2 depicts a block diagram of a portable computing device 110, in accordance with embodiments of the present invention. The portable computing device 110 includes hardware and software components, and can be considered a microcomputer. The portable computing device 110 includes a specialized integrated circuit 250. The specialized integrated circuit may be specialized and dedicated to perform only the methods described herein. Embodiments of the specialized integrated circuit 250 may be an application specific integrated circuit (ASIC). In other exemplary embodiment, the integrated circuit 250 is a "Raspberry Pi®" sensor component of a microcomputer. Furthermore, embodiments of the specialized integrated circuit 250 may include an embedded processor 241, a camera 242, a display 243, and a wireless network interface 244. The circuit 250 is also coupled to a GPS sensor, a microphone, and a speaker, not shown in FIG. 2. The portable computing device 110 further includes a power source 245, such as one or more batteries. Software components of the portable computing device 110 are located in a memory system 205 of the portable computing device 110, or a memory system coupled to the specialized integrated circuit 250. The specialized integrated circuit 250 includes the embedded processor 241 for implementing the tasks associated with the portable computing device 110. In an exemplary embodiment, the portable computing device 110 communicates with the computing system 120 to transmit information/data from collected audio and image data collected by the camera 242. For example, the specialized integrated circuit 250 utilizes the wireless network interface 244 for transmitting digital audio and image data, over a network 107, to the computing system 120. Alternatively, the wireless network interface 244 may securely and exclusively connect to a user computing device (e.g. smartphone) associated with a user, over a short range communication network, and the user computing device can transmit additional environmental data (e.g. location data, images, etc.) to the computing system 120.

The portable computing device 110 is equipped with or coupled to a camera 242 to detect, photograph, scan, analyze, or otherwise capture digital data of one or more places of interest within an environment to identify the object or place of interest inquired about by the user. The camera 242 can be a charge coupling device (CCD) imaging sensor or similar imaging sensor to detect, photograph, scan, analyze, or otherwise capture images of places of interest. In an exemplary embodiment, the camera 242 may be a micro digital camera. Further, the portable computing device 110 is equipped with or coupled to a display 243. The display 243 includes a graphical user interface (GUI) that displays messages, text, results, instructions, questions, prompts, etc. received from the computing system 120 in response to the user operating the portable computing device 110 in a variety of ways described in greater detail infra. The GUI can be modified or otherwise augmented overtime to reflect an interest of the user based on feedback from the user as the user learns about places of interest. Moreover, the portable computing device 110 includes a switch 246. The switch 246 may be partially located external to a housing of the portable computing device 110. The switch 246 can be a mechanical switch, or an electromechanical switch. For instance, the switch 246 is a button accessible to the user operating the portable computing device 110, wherein if the user depresses the switch 246, the power source 245 is activated (e.g. a circuit is completed by metal-to-metal contact, or other suitable means to employ a switch to turn on a power source may be used). Activating the power source 245 provides power to the specialized integrated circuit 250, and the camera 242 can be automatically activated as power is provided to the specialized integrated circuit 250 to begin an object or place of interest identification procedure. By way of example, a user presses the switch 246, or a portion of the switch accessible to the user external to the housing, which powers up the specialized integrated circuit 250 to activate the camera 242 for capturing and/or gathering real-world signals needed to identify a place of interest.

Additionally, the portable computing device 110 includes software components, such as a location module 231, a capture module 232, and a transmission module 233. A "module" refers to a hardware based module, software based module, or a module may be a combination of hardware and software. Hardware based modules include self-contained components such as chipsets, specialized circuitry and one or more memory devices, while a software-based module is part of a program code or linked to the program code containing specific programmed instructions, which may be loaded in the memory system 205 of the portable computing device 110 and/or in a memory coupled to the specialized integrated circuit 250. A module (whether hardware, software, or a combination thereof) may be designed to implement or execute one or more particular functions or routines.

The location module 231 includes one or more components of hardware and/or software program code for obtaining location data of the portable computing device 110 using one or more GPS sensors or chips local to the portable computing device 110.

The capture module 231 can be activate and deactivated by the computing system 120 remotely to begin the identification/detection process. Alternatively, the user can control the operation of the camera 242 by pressing switch 246 or another physical switch located on the portable computing device 110. The capture module 231 or other module of the portable computing device 110 can establish a connection or link between the portable computing device 110 and the user computing device, using the wireless network interface 244. The link between the portable computing device 110 and the user computing device may be established using Bluetooth®, RTM, technology, near field communication (NFC), and/or a combination thereof.

The transmission module 232 includes one or more components of hardware and/or software program code for transmitting the location data and the digital image data from the portable computing device 110 to the computing system 120 over network 107. For instance, the transmission module 232 calls an API and uploads the location data and the digital image data to the computing system 120 for analysis by the visual recognition engine 111. Additional modules are included with the portable computing device 110, but are not shown in FIG. 2, such as a display module that includes one or more components of hardware and/or software program code for displaying messages, text, images, colors, numbers, exemplary arrangements, instructions, etc. In some embodiments, the portable computing device 110 receives communications, messages, instructions, etc. directly from the computing system 120, and the display module displays the communications, messages, instructions, etc. on the display 243. In other embodiments, the communications, messages, instructions, etc. are received by a linked user computing device, and the user computing device directly displays the results, or sends the data to the portable computing device 110 over the short range communication network linking the user computing device and the display module displays the communications, messages, instructions, etc. on display 243.

Figure 3:
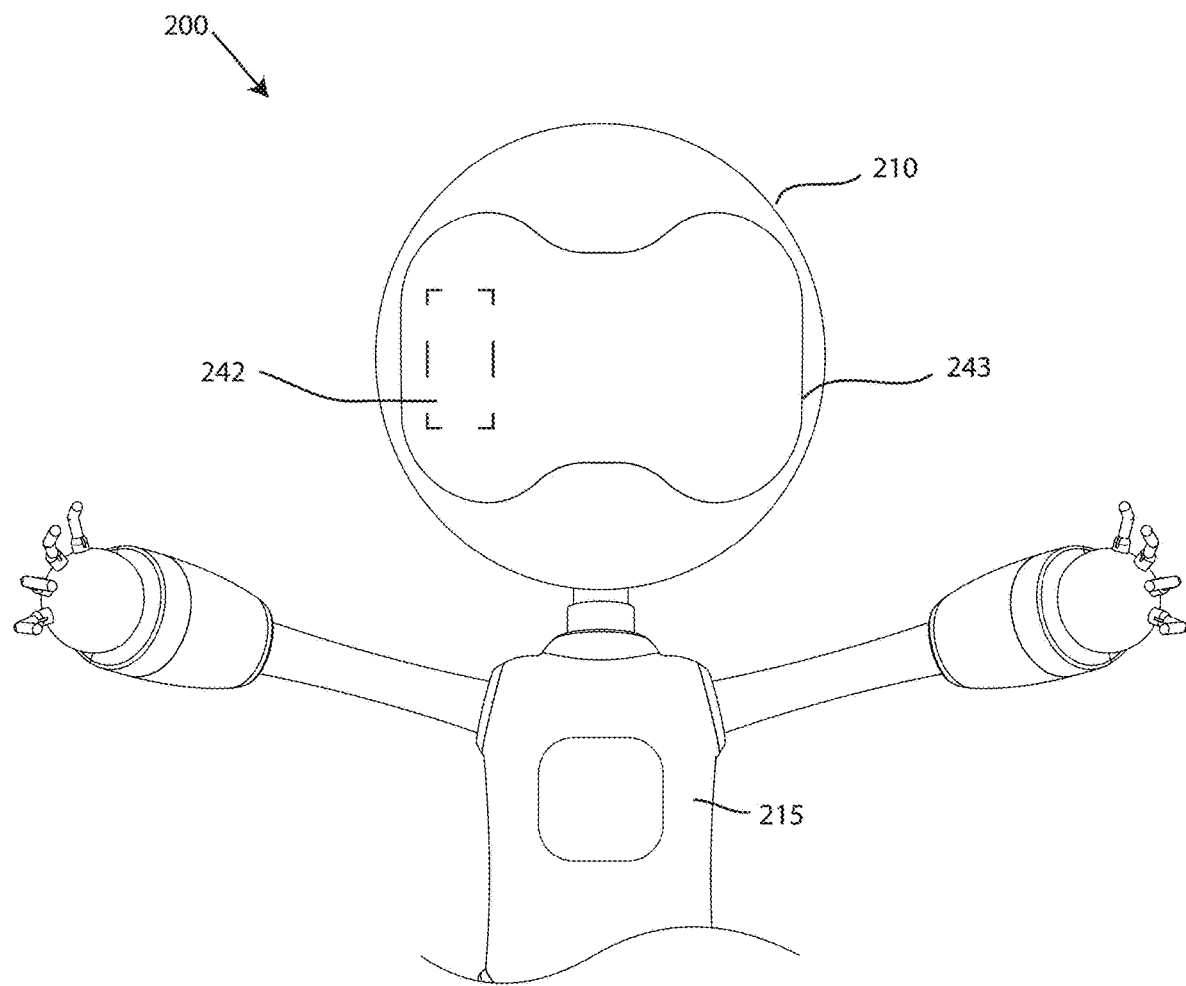
FIG. 3 depicts a perspective view of a portable computing device, in accordance with embodiments of the present invention.

FIG. 3 depicts a perspective view of a portable computing device 110, in accordance with embodiments of the present invention. In the illustrated embodiment, the portable computing device 110 is a robot 200 with having a head portion 210 and a body portion 215. The head portion 210 includes a display 243; the camera 242 is also located in the head portion 210. While one display 243 and one camera 242 are shown in the illustrated embodiment, the robot 200 can include more than one display 243 and more than one camera 242 positioned on the head portion 210 and/or the body portion 215 of the robot 200. The overall shape and size of the head portion 210 and the body portion 215 can vary to accommodate various needs, designs, applications, and the like. Furthermore, the robot 200 can include one or more sensors in addition to the camera 242, coupled to the integrated circuit 250. The one or more sensors can include a color sensor, a temperature sensor for detecting a temperature of the environment, a moisture sensor for detecting a moisture level of the environment, a GPS sensor for tracking a location of the robot 200, accelerometers, gyroscopes, and other sensors for obtaining physical characteristics of a movement of the robot 200. Further, the robot 200 may require ultra-low processing requirements to operate the camera 242 to keep computer processing requirements to a minimum, or to allow for those spared resources to be used elsewhere, such as for movement of the robot 200. For instance, the robot 200 can be programmed to move around within an environment to enhance the learning experience of the user. The robot 200 may be comprised of plastic, metal, or other materials can be used in combination with plastic or without plastic to form the robot 200.

Referring back to FIG. 1, the assisted learning system 100 includes a translator. The translator is a software application, engine, or tool for providing machine translations for words between languages. The computing system 120 may utilize the translator to translate the words for information about places of interest into several languages as requested by the user. In the illustrated embodiment, the translator is a remote service accessed by the computing system 120 over network 107; however, a translation software application can be installed directly onto the computing system 120.

The assisted learning system 100 includes visual recognition engine 111. The visual recognition engine 111 is a software application, engine, or tool for analyzing a content or insights of an object, scene, location, building, store, venue, face, color, and the like. In an exemplary embodiment, the visual recognition engine is IBM WATSON VISUAL RECOGNITION SERVICE. The computing system 120 may utilize the visual recognition engine 111 to identify real places of interest in a real-world environment of the user. In the illustrated embodiment, the visual recognition engine 111 is a remote service accessed by the computing system 120 over network 107; however, a visual recognition software application can be installed directly onto the computing system 120.

The assisted learning system 100 includes a social media platform 112. The social media platform 112 can be a network, a computing system, a network of computers, a plurality of computers, databases, networks, one or more databases, storage devices, repositories, servers, computers, engines, and the like, that service, run, store or otherwise contain information and/or data regarding a social media network of a user and the user's social contacts. The social media platform 111 is accessed or shares a communication link over network 107, and is managed and/or controlled by a third party, such as a social media company. In an exemplary embodiment, the social media platform 111 is a social media network, social media website, social media engine, and the like, stores or otherwise contains content supplied by a social contact of the user or the user. Moreover, the assisted learning system 100 includes a browser 113 for accessing the Internet and performing searches using a search engine.

Furthermore, the computing system 120 of the assisted learning system 100 is equipped with a memory device 142 which stores various data/information/code, and a processor 141 for implementing the tasks associated with the assisted learning system 100. An assisted learning application 130 is loaded in the memory device 142 of the computing system 120. The assisted learning application 130 can be an interface, an application, a program, a module, or a combination of modules. In an exemplary embodiment, the assisted learning application 130 is a software application running on one or more hack end servers (e.g. computing system 120), servicing the portable computing device 110 and potentially a linked personal user computing device.

Referring back to FIG. 1, the assisted learning application 130 of the computing system 120 includes a detection module 131, a request module 132, an activation module 133, an image recognition module 134, and a feedback module 135. A "module" refers to a hardware-based module, a software-based module, or a module that is a combination of hardware and software. Hardware-based modules include self-contained components such as chipsets, specialized circuitry and one or more memory devices, while a software-based module is a part of a program code or linked to the program code containing specific programmed instructions, which is loaded in the memory device of the computing system 120. A module (whether hardware, software, or a combination thereof) is designed to implement or execute one or more particular functions or routines.

The detection module 131 includes one or more components of hardware and/or software program code for detecting that the portable computing device 110 is in a game mode. The detection module 131 also detects a state of various initialization, default setting, options menus, and startup procedures associated with the portable computing device 110. For instance, the detection module 131 detects whether the portable computing device 110 is powered on prior to performing any computational processes. The portable computing device 110 can be powered on by pressing a switch, such as switch 246, or can be powered on with a voice command, processed by the detection module 131. The detection module 131 also detects and/or sets from a user preferences the default language to be used during the interactions with the user. If the default language is English, then the information is output in English, unless translations are requested. The detection module 131 may provide updates to the options menus that allow the user to vary the learning program.

Furthermore, the detection module 131 includes one or more components of hardware and/or software program code for converting an audio file received from a portable computing device into text. The audio file is sent to the computing system 120 by the portable computing device 110, in response to collecting the audio from a real-world environment. As the user speaks, one or more microphones of the portable computing device 110 collects the audio and creates a digital audio file (e.g. creates a .mp3 pack) for transmitting to the computing system 120 over the network 107. The digital file may be packetized and sent over the network to increase the speed in which the computing system 120 receives and parses the audio file over the network 107. The one or more microphones, when the portable computing device 110 is powered on, can continuously listen for and collect audio of the user so that the user can interact with the portable computing device 110 without needing to prompt the portable computing device 110 to listen for commands. The detection module 131 converts that audio file into text.

The request module 132 includes one or more components of hardware and/or software program code for parsing the text to determine that a user is requesting information regarding a place of interest. For example, the request module 132 uses speech-to-text software to convert the audio file into text. The language spoken by the user can also be detected by the request module 132 using the speech-to-text software as well a translation API associated with translator. The language spoken by the user can be automatically configured as the default language for outputting audible answers to the user's questions. In response to converting the received audio file to text, the request module 132 parses the text using natural language processing techniques or comparable techniques to understand what the user is saying. The parsing of the text can include detecting one or more keywords or triggers, such as "tell me about this building", that can initiate a particular response by the computing system 120. The request module 132 can continuously parse the text as the audio file data is continuously received in real-time from the portable computing device 110. Based on the natural language analysis, the request module 132 can determine that a user is requesting information and/or identity of a place of interest in the environment shared by the user (e.g. "Is this a museum?).

In response to determining that the user is requesting information regarding the place of interest, geographical location data and image data is obtained. The activation module 133 of the computing system 120 includes one or more components of hardware and/or software program code for obtaining a geographical location of the portable computing device 110 using a plurality of sensors of the portable computing device 110. For instance, the activation module 133 requests transmission of location data from a GPS sensor local to the portable computing device 110. The location data includes specific coordinates, an intersection, address, micro-location data, city information, and the like.

Moreover, the activation module 133 includes one or more components of hardware and/or software program code for activating a camera 242 of the portable computing device 110 to capture one or more images of a surrounding of the user within a field of view of the view of the camera 242. The one or more images are received from the portable computing device 110 over a network 107. For instance, the camera 242 is remotely activated automatically after detecting that the user is asking about a place of interest. The camera 242 captures one or more photographs of the user's surrounding or initiates a live video feed from the perspective of the camera 242. The user can position the portable computing device 110 within the environment so that the camera 242 is facing the place of interest that the user is inquiring about. In an exemplary embodiment of the robot 200 shown in FIG. 3, the user can position the robot so that the display 243 of the head portion 210 of the robot 200 is facing the place or interest, or so that the place of interest is within the field of view of the robot's camera. In another embodiment using robot 200, the user may remotely control the robot 200 in space so that the robot 200 is facing the place of interest. The user can control the robot 200 using voice commands or a remote controller, depending on the capabilities of the robot 200. In other embodiments where the portable computing device 110 is a smartphone or other handheld or wearable computing device, the user can manually position the portable computing device 110 so that the place of interest is within a field of view of the device's camera. The portable computing device 110 transmits the data to the computing system 120 for analysis by the visual recognition engine 111 to identify the place of interest, over network 107. In some cases, the camera 242 may fail to satisfactorily capture the details of the place of interest due to insufficient data received from the camera 242. The activation module 132 can detect that the image data is not successfully obtained by the camera 242 of the portable computing device 110, and then provide feedback to a user to reposition the portable computing device 110 to improve image capturing. In response to the repositioning of the portable computing device 110, the activation module 132 can again activate the camera 242 to photograph or otherwise film the place of interest.

Furthermore, the computing system 120 includes an image recognition module 134. The image recognition module 134 includes one or more components of hardware and/or software program code for analyzing the one or more images using a visual recognition engine 111 in combination with the geographical location data to identify the place of interest. For instance, the image recognition module 134 sends the received digital image data to the visual recognition engine 111 to identify the objects/places contained in the photograph or video frame(s). For example, if the user asks, "what is the name of this tall building?" as the user is in the passenger's side of a vehicle at a red light, the portable computing device 110 sends the current location data of the portable computing device 110 and one or more images captured by the camera 242. The image recognition engine 111 analyzes the content of the image for identifying features of the building to identify the building. The location data narrows down the possible buildings or filters out as many possibilities as possible based on the current location data. The image recognition engine 111 may output three or four possible buildings based on the image data, while the location data is used to rule out buildings that do not match the location data. The combination of the results of the visual recognition engine 111 analyzing the image(s) of the objects and the location data is used to identify the place of interest. In some cases, the computing system 120 can determine the place of interest only using the location data. As a result, the image recognition engine 111 is used to confirm the results of the location data to improve accuracy of the identification of the place of interest.

The image recognition module 134 searches the identified place of interest using browser 113 to obtain information about the place of interest. For example, the image recognition module 134 retrieves facts about the place of interest, such as a year built, an official name of the place, a type of business, a history of the place, and the like. In an exemplary embodiment, the search is tailored to the user's question or follow up question about the place of interest. For example, if the user asks, "how was this building on the corner built," the image recognition module 134, in addition to identifying the building according to the procedure described above, generates a query relating to the construction of the building and inputs the query into a search engine using browser 113.

Furthermore, the image recognition module 134 also determines whether an interactive option is available for the place of interest, in response to identifying the place of interest. An interactive option refers to an activity that the user can participate in that relates to the place of interest. Examples of an interactive option include tickets for a tour, upcoming shows, schedules of activities, virtual tours, tickets for an upcoming attraction, tour guide prices, schedules games, talent act schedules, and the like. The image recognition module 134 determines whether an interactive option is available by utilizing a search engine of the browser 113 to visit the place of interest's official website, related websites, local activity websites, and the like.

Furthermore, the computing system 120 includes a feedback module 135. The feedback module 135 includes one or more components of hardware and/or software program code for instructing the portable computing device 110 to output the interactive option to the user along with information about the place of interest. For instance, the feedback module 135 provides at least one of a visual feedback and an audible feedback to the user, regarding the place of interest and interactive options associated therewith. The feedback includes information about the place of interest, such as facts, history, interactive options, and the like. Further, the feedback module 135 can modify or augment a graphical user interface of the portable computing device 110 to display words, numbers, graphics, user progress, user interest scores, and the like. The portable computing device 110 can be used on a daily basis to learn about local landmarks in an interactive manner.

Additionally, the portable computing device 110 can assist learning vocabulary words in a language different from the default language. For instance, the computing system 120 can receive a request from the user that the description of the place of interest be audibly output in a different language that is different than the default language, or both languages. The computing system 120 receives the request as an audio file, converts the speech into text, and parses the text, as described above, to understand the question of the user. The computing system 120 utilizes translation software to translate the word associated with the object into a different language (e.g. as requested by the user or as the second language denoted in user settings) to determine a translated word. The computing system 120 then instructs the portable computing device 110 to audibly and/or visually output the translated word associated with the place of interest in the different language. As a result, the user can learn about places of interest in more than one language.

Figure 4:
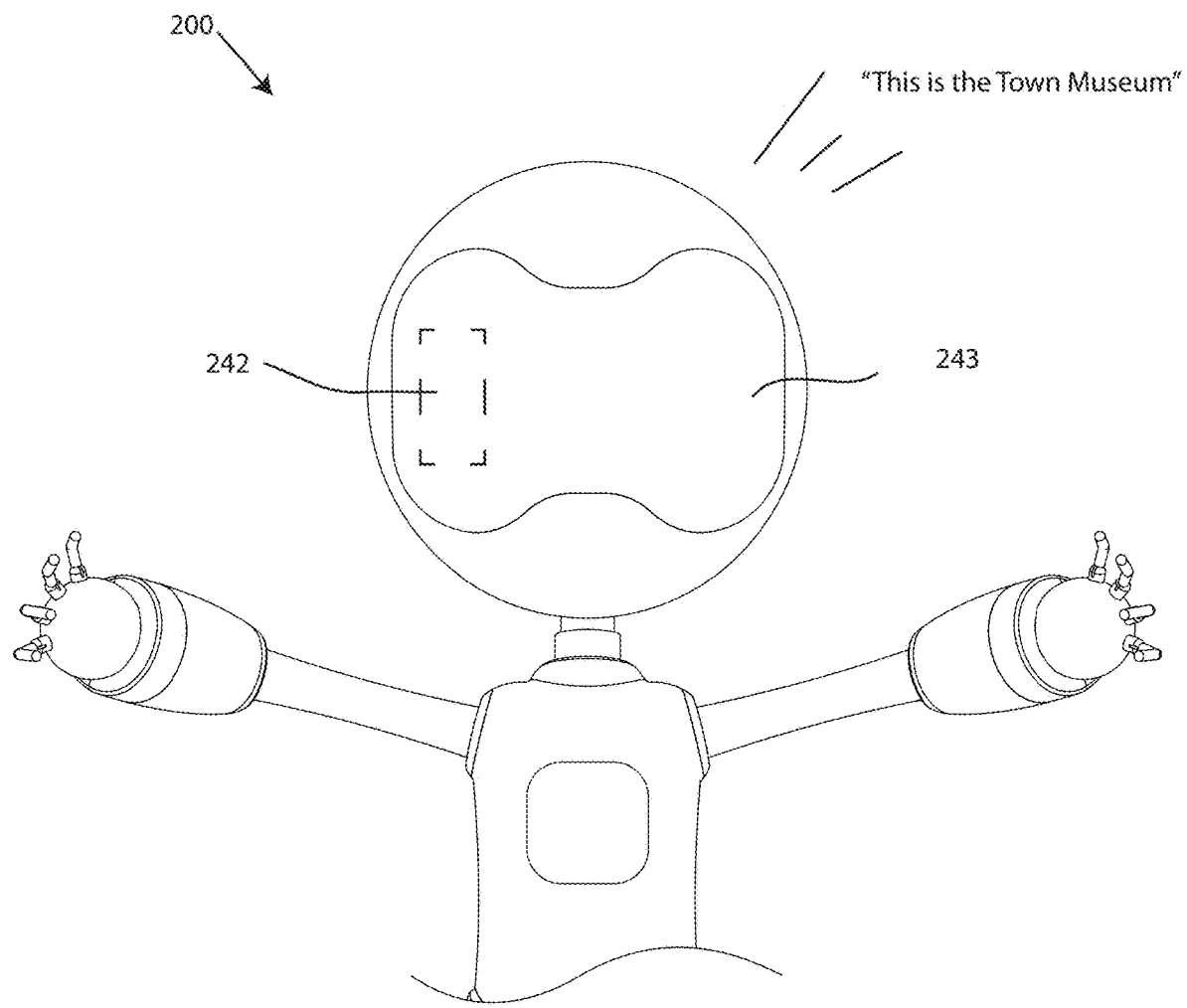
FIG. 4 depicts a schematic view of a robot identifying a place of interest in response to a request from the user, in accordance with embodiments of the present invention.
Figure 5:
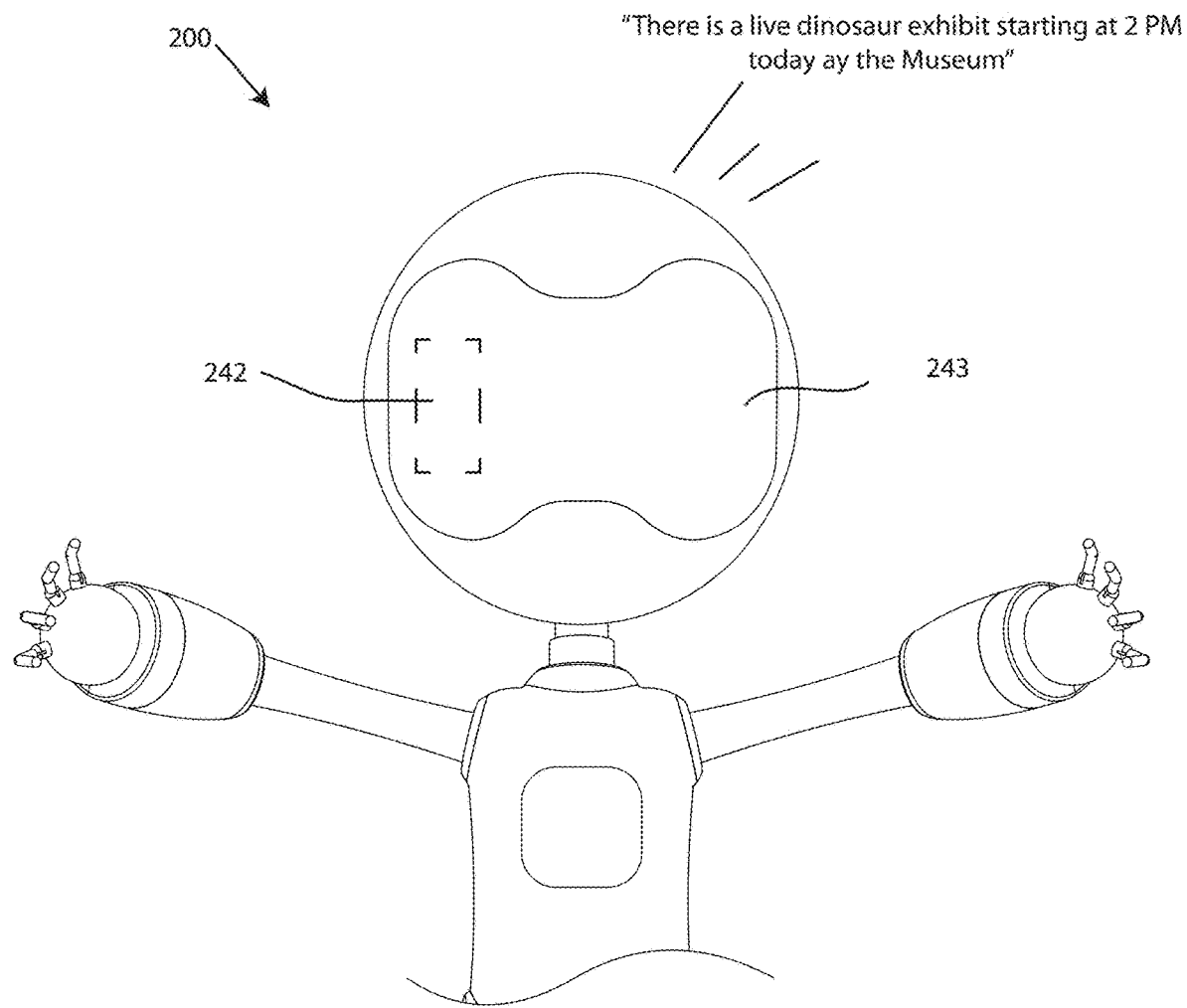
FIG. 5 depicts a schematic view of a robot alerting the user to an interactive option associated with the place of interest identified in FIG. 4, in accordance with embodiments of the present invention.

By way of example, the portable computing device 110 can be used to learn about places of interest as the user moves around a city or town. FIG. 4 depicts a schematic view of a robot 200 identifying a place of interest in response to a request from the user, in accordance with embodiments of the present invention. In the illustrated embodiment, the user asks the robot 200 to identify the large building with multiple columns as the user is walking nearby a downtown area of Town A. The robot takes two pictures of the large building with multiple columns and transmits the image data and a current location data over a network to the computing system 120. The robot 200 responds "This is the Town Museum." The robot 200 further audibly explains to the user that museum was built in 1974 and has 44 total exhibits. FIG. 5 depicts a schematic view of a robot 200 alerting the user to an interactive option associated with the place of interest identified in FIG. 4, in accordance with embodiments of the present invention. In addition to identifying the place of interest as the town museum and providing some factual information relating to the museum, the robot 200 audibly outputs "There is a live dinosaur exhibit today at the Museum." The interactive feedback alerts the user to a potential interaction option that the user could participate in.

Figure 6:
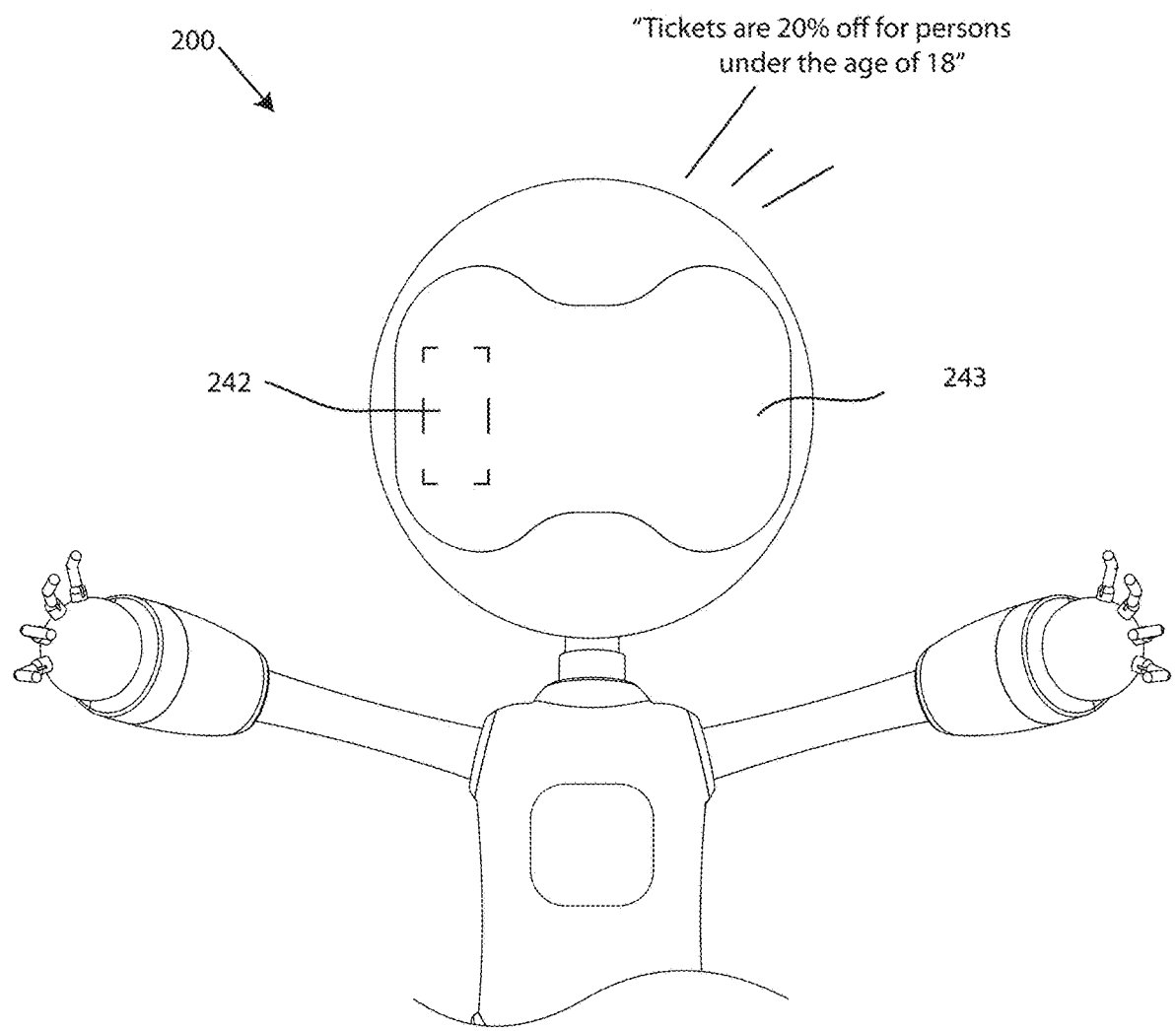
FIG. 6 depicts a schematic view of a robot displaying an offer related to the interactive option of FIG. 5, in accordance with embodiments of the present invention.

Additionally, the computing system 120 optionally displays one or more offers or promotions relating to the interactive option associated with the place of interest. FIG. 6 depicts a schematic view of a robot 200 displaying an offer related to the interactive option of FIG. 5, in accordance with embodiments of the present invention. Continuing with the example above, the robot 200 audibly outputs "Tickets are 20% off for persons under the age of 18." The offer(s) are retrieved by the computing system 120 by searching using the browser, being promoted by the place of interest. The offer can also be displayed on the display 243 as a selectable link to purchase the tickets. The computing system 120, upon the user selecting the selectable link, purchases a ticket required to participate in the interactive option associated with the place of interest. For example, the user can purchase the ticket to the dinosaur exhibit by interacting with the robot 200.

Figure 7:
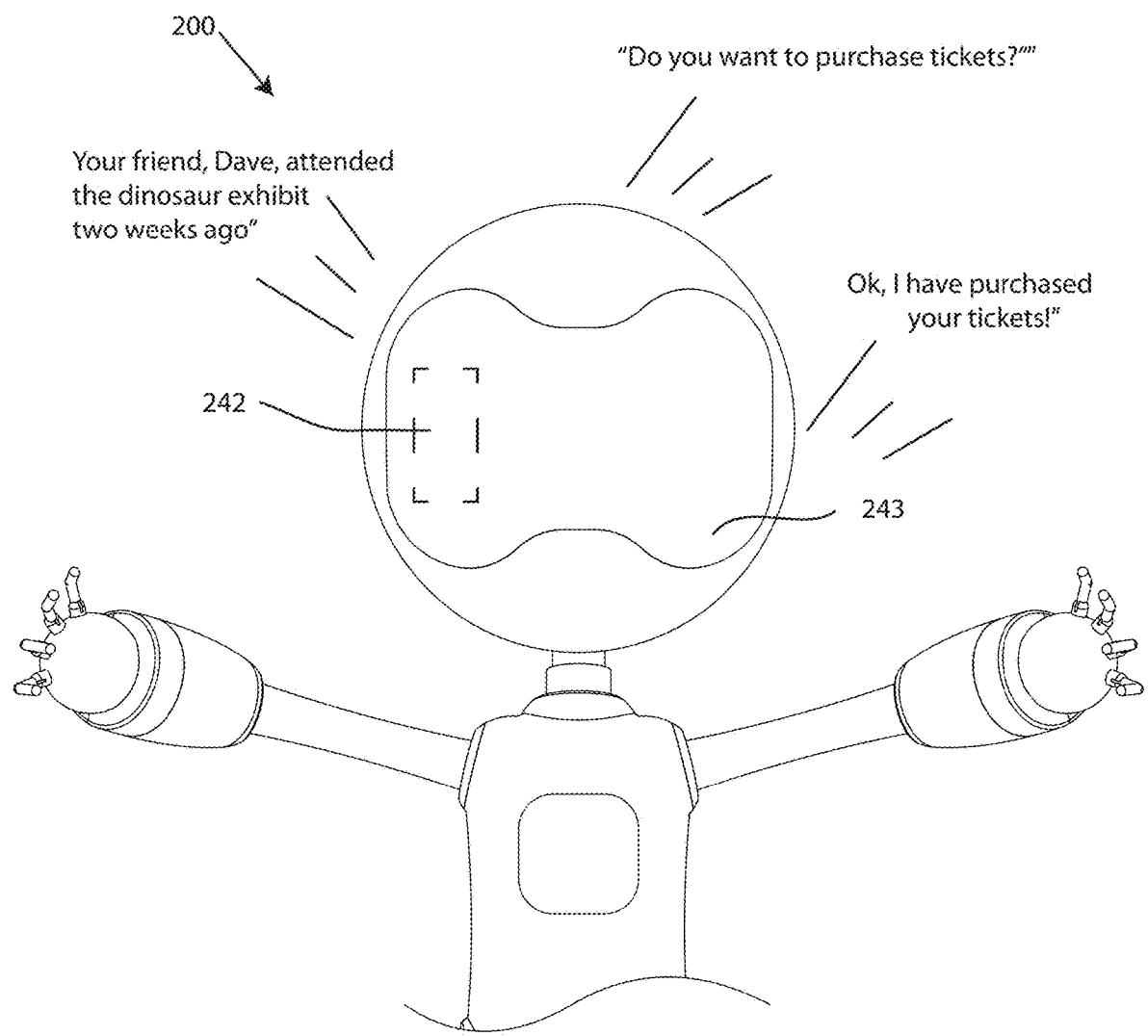
FIG. 7 depicts a schematic view of robot informing the user about social contacts activity, in accordance with embodiments of the present invention.

Further, the portable computing device 110 informs the user about activities of social contacts with respect to interactive options associated with places of interest. For example, with proper permissions or approvals in place, the computing system 120 checks a social media profile or "page" of social contacts of the user from the social media platform 112 to determine that a social contact of the user has previously participated in the interactive option associated with the place of interest. Alternatively, the computing system 120 creates a unique social component that allows users to add friends. The activity of the added friends can be tracked and saved by the computing system 120, when the added friends have provided the proper approval to do so. The computing system 120, in response to detecting that an interactive option is available for a place of interest, also searches the user's added friends within the social component and alerts the user that an added friend has previously participated in the interaction option. FIG. 7 depicts a schematic view of robot 200 informing the user about social contacts activity, in accordance with embodiments of the present invention. In the illustrated embodiment, the robot 200 asks the user, "Do you want to purchase tickets?" in response to alerting the user to the availability of an interactive option (e.g. tickets to a dinosaur exhibit at the town museum). The robot 200 adds, "Your friend, Dave, attended the dinosaur exhibit two weeks ago." Upon learning that the user's friend has attended the exhibit, the user responds to the robot 200 with a command to purchase tickets. The robot 200 confirms, "Ok, I have purchased your tickets!"

In further embodiments, the computing system 120 includes a cognitive component that tracks a user interest score and saving the score in the user profile stored in the memory of the portable computing device 110 and/or on the data repository 125 of the computing system and/or a central cloud server. The computing system 120 includes a cognitive module that records responses from the user received from the portable computing device 110. The portable computing device 110 captures verbal responses by the user to the information provided by the portable computing device 110. For example, the user may provide audio feedback, such as asking multiple follow up questions regarding the place of interest, which suggests that the user is interested in the place of interest. In other embodiments, the camera 242 of the portable computing device 110 captures images of the user smiling or having a facial expression indicating that the user is enjoying the content. The visual feedback of the user can be used to determine whether the user seems interested or disinterested in the place of interest. The cognitive module calculates an interest score corresponding to an interest of the user in the place of interest, based on the responses received from the portable computing device. By way of example, the cognitive module increases or decreases the interest score based on audio and/or visual feedback received from the user. The feedback can be positive, negative, or neutral. If the user shows a lack of interest by saying, "I do not care about this place," the cognitive module decreases the user interest score by "1 point." If the user states, "I do not like this place," the cognitive module decreases the score by "3 points." If the user states, "I like this place," the cognitive module increases the user interest score by "3 points." Various scoring schemes can be used to calculate a total user interest score.

Figure 8:
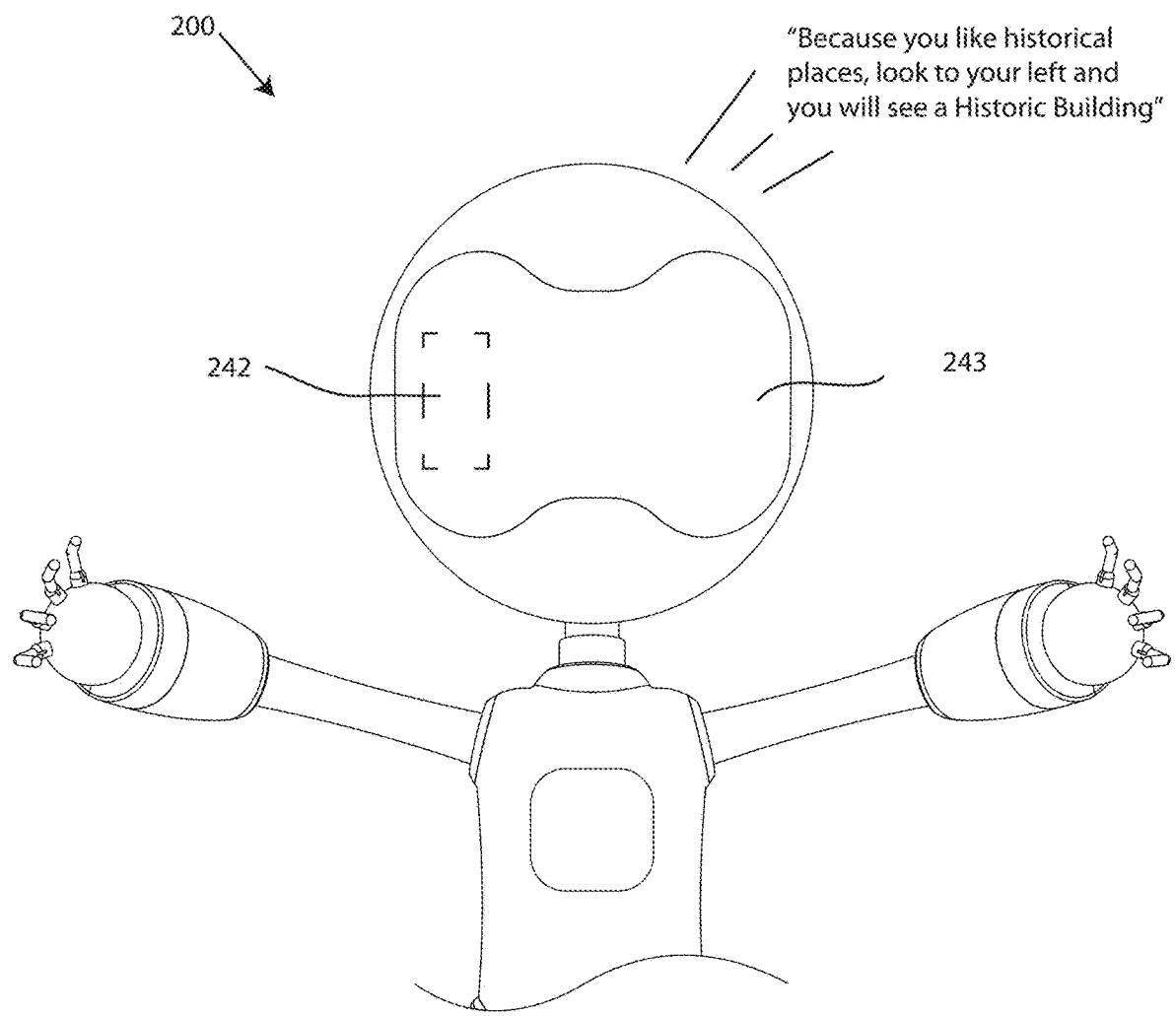
FIG. 8 depicts a schematic view of the robot alerting the user to a nearby place of interest that correlates to an interest of the user, in accordance with embodiments of the present invention.

The computing system 120 utilizes the user interest score to provide information about nearby places of interest that match a type of place that has a score that exceeds a threshold score, without requiring a voice input from the user. For example, if the cognitive module of the computing system 120 determines that the user is interested in historical buildings, the portable computing device 110 is used to alert users to historical buildings as the user moves within a certain proximity to the historical building. FIG. 8 depicts a schematic view of the robot 200 alerting the user to a nearby place of interest that correlates to an interest of the user, in accordance with embodiments of the present invention. In the illustrated embodiment, the robot 200 detects that a historical building is nearby the user, and knowing that the user is interested in historical buildings from the user interest score, the robot 200 audibly outputs, "Because you like historical places, look to your left and you will see a Historical Building." Likewise, the computing system 120 utilizes the user interest score to ignore information about places of interest that match a type of place that has a score that is below a threshold score.

In further embodiments, the portable computing device 110 outputs information about places of interest that are uniquely tailored to the user. The computing system 120 gathers social media information about social contacts of the user from the social media platform 112 as the portable computing device 110 is moving within an environment. Using the gathered information, the computing system 120 determines that a place of interest holds a personal significance to the user. The computing system 120 instructs the portable computing device 110 to audibly output the personal significance to the user. In other words, the computing system 120 gathers more information about the user and the user's social contacts to provide a more immersive experience. The computing system 120 gathers social media information in real-time about the user's social contacts and performs correlations between the user and the place of interest. By way of example, the portable computing device 110 alerts the user to the school that the user's mother attended when the user's mother was the user's age by analyzing the social media page of the user's mother and correlating the education information (e.g. elementary school) of the mother to the current geographical location of the portable computing device. The robot 200 detects that the user is nearby the elementary school that the user's mother attended, while the user is riding in a school bus on a field trip. The robot 200 audibly outputs and/or displays on display 243, "You are now passing the school that your mother attended when she was your age." Accordingly, the computing system 120 optionally instructs the portable computing device 110 to alert the user to nearby places of interest to the place of interest that have personal significance to the user based on social media profile information.

Various tasks and specific functions of the modules of the computing system 120 may be performed by additional modules, or may be combined into other module(s) to reduce the number of modules. Further, an embodiment of the computer or computer system 120 comprises specialized, non-generic hardware and circuitry—specialized discrete non-generic analog, digital, and logic-based circuitry) (independently or in combination) particularized for executing only methods of the present invention. The specialized discrete non-generic analog, digital, and logic-based circuitry includes proprietary specially designed components (e.g., a specialized integrated circuit, such as for example an Application Specific Integrated Circuit (ASIC), designed for only implementing methods of the present invention).

Furthermore, the assisted learning system 100 uses specific hardware, such as camera, for identifying a place of interest within a real-world environment. The GUI of the specialized device (e.g. robot 200) is modified or otherwise augmented to present custom results to the user. The assisted learning system 100 provides a technical solution by augmenting GUIs of specialized devices based on a set outcomes determined by the operation of specific hardware to identify a place of interest that is unique to the user.

Figure 9:
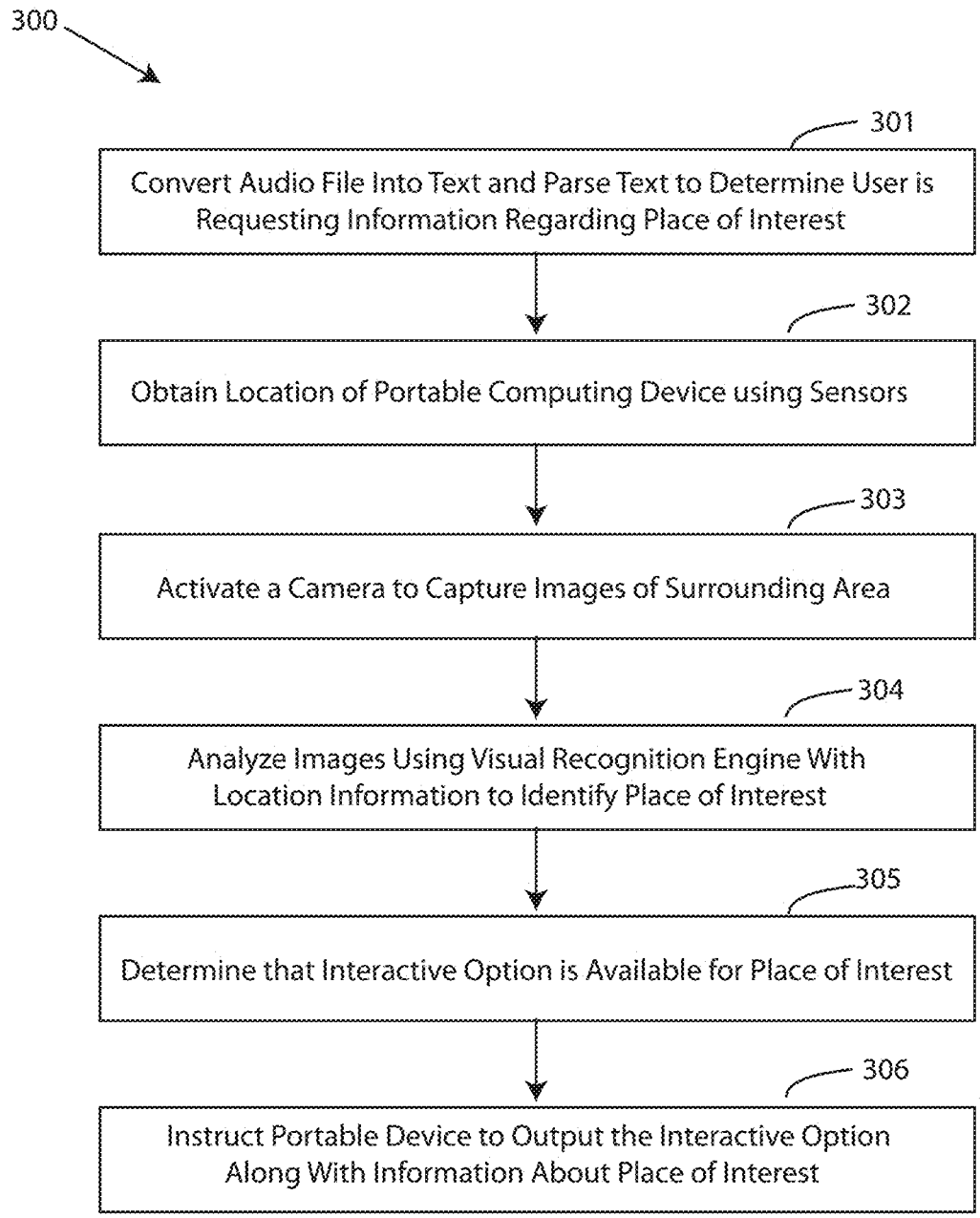
FIG. 9 depicts a flow chart of a method for assisted-learning with a portable computing device, in accordance with embodiments of the present invention.

Referring now to FIG. 9, which depicts a flow chart of a method 300 for assisted-learning with a portable computing device, in accordance with embodiments of the present invention. One embodiment of a method 300 or algorithm that may be implemented for assisted-learning with a portable computing device with the assisted learning system 100 described in FIGS. 1-8 using one or more computer systems as defined generically in FIG. 11 below, and more specifically by the specific embodiments of FIG. 1.

Embodiments of the method 300 for assisted-learning with a portable computing device, in accordance with embodiments of the present invention, may begin at step 301 wherein an audio file is converted into text and parsed to determine that the user is requesting information regarding a place of interest. Step 302 obtains a location of the portable computing device using at least one sensor (e.g. GPS sensor). Step 303 activates a camera to capture images of a surrounding area of the user. Step 304 analyzes received images using a visual recognition engine with the location information to identify the place of interest. Step 305 determines that an interaction option is available for the identified place of interest. Step 306 instructs the portable computing device to output (audibly and/or visually) the interactive option along with the information of the place of interest.

Figure 10:
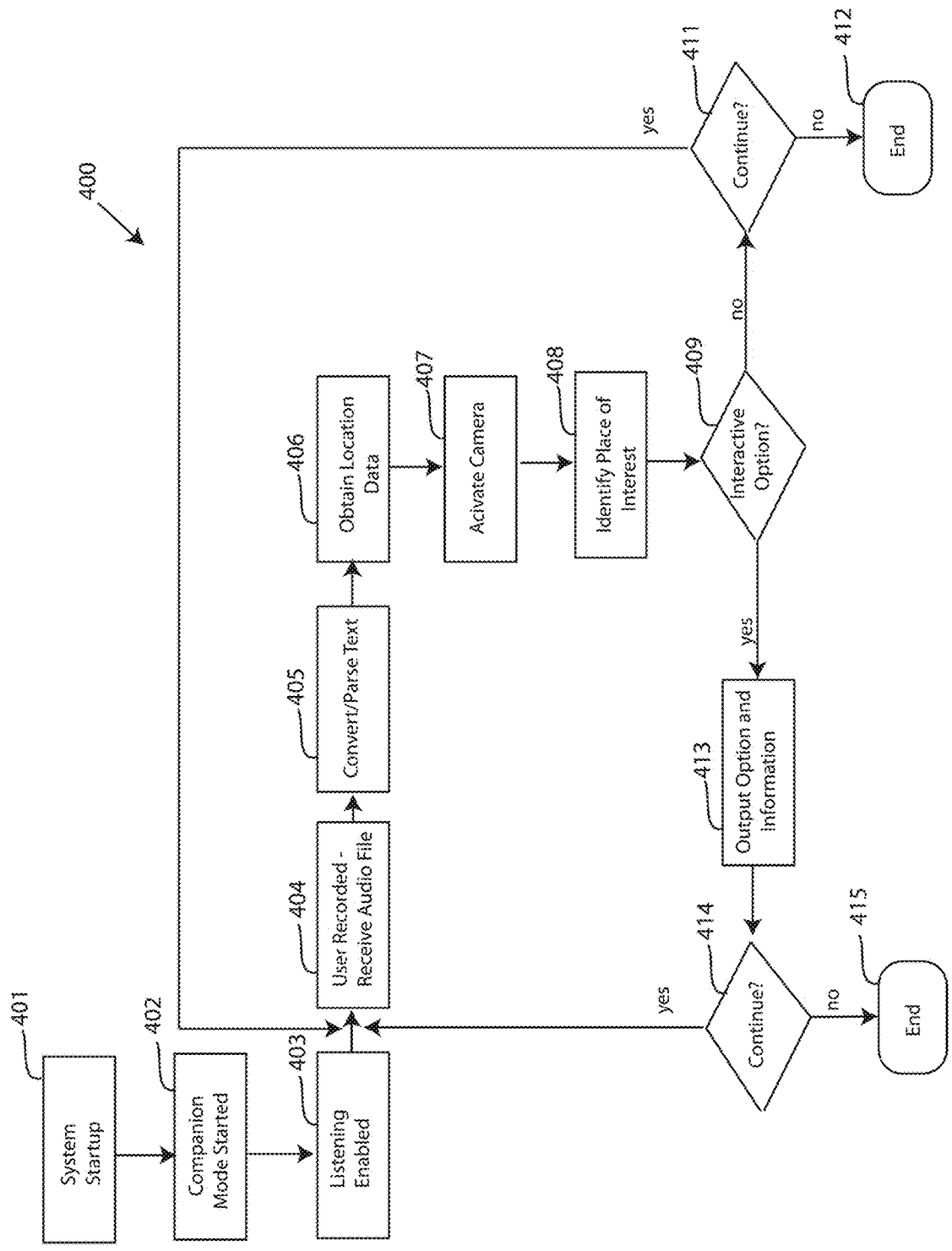
FIG. 10 depicts a detailed flow chart of a mode of the portable computing device, in accordance with embodiments of the present invention.

FIG. 10 depicts a detailed flow chart of a mode 400 of the portable computing device, in accordance with embodiments of the present invention. Step 401 starts the system. Step 402 started a companion game mode (e.g. learning module). Step 403 enables a listening of the user. At step 404, the user is recorded and the audio file is sent to the computing system. Step 405 converts the audio data to text data, which is parsed to determine that a user is requesting information about a place of interest in the real-world. Step 406 obtains location data from the portable computing device. Step 407 activates the camera of the portable computing device. Step 408 identifies the place of interest. Step 409 determines whether an interactive option is available with respect to the place of interest. If no, then step 411 determines whether the user wants to continue after the device outputs the information about the place of interest. If the user does not want to continue, then the mode ends at step 412. If the user does want to continue, then the method returns to step 404. If an interactive option is available, then step 413 outputs the interactive option and accompanying information. Step 414 determines whether the user wants to continue after the device outputs the interactive information about the place of interest. If the user does not want to continue, then the mode ends at step 415. If the user does want to continue, then the method returns to step 404.

Figure 11:
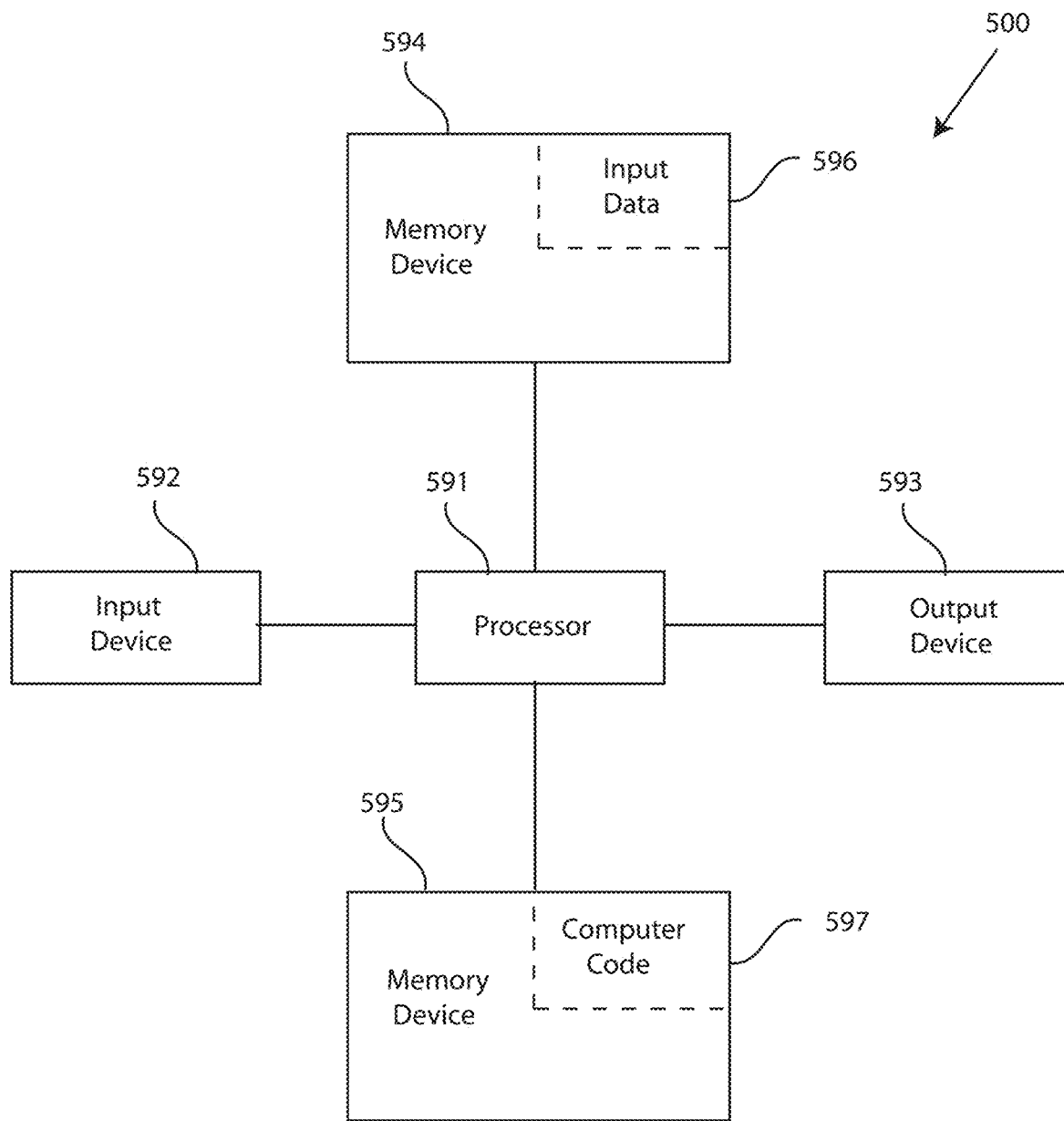
FIG. 11 depicts a block diagram of a computer system for an assisted learning system of FIGS. 1-8, capable of implementing a method for assisted-learning with a portable computing device of FIGS. 9-10, in accordance with embodiments of the present invention.

FIG. 11 depicts a block diagram of a computer system for the assisted learning system 100 of FIGS. 1-8, capable of implementing methods for assisted-learning with a portable computing device of FIGS. 9-10, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for assisted-learning with a portable computing device in the manner prescribed by the embodiments of FIGS. 9-11 using the assisted learning system 100 of FIGS. 1-8, wherein the instructions of the computer code 597 may be executed by processor 591 via memory device 595. The computer code 597 may include software or program instructions that may implement one or more algorithms for implementing the method for assisted-learning with a portable computing device, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 11.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to assisted learning with a portable computing device. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to provide assisted-learning with a portable computing device. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for assisted-learning with a portable computing device. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for assisted-learning with a portable computing device.

A computer program product, of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models areas follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
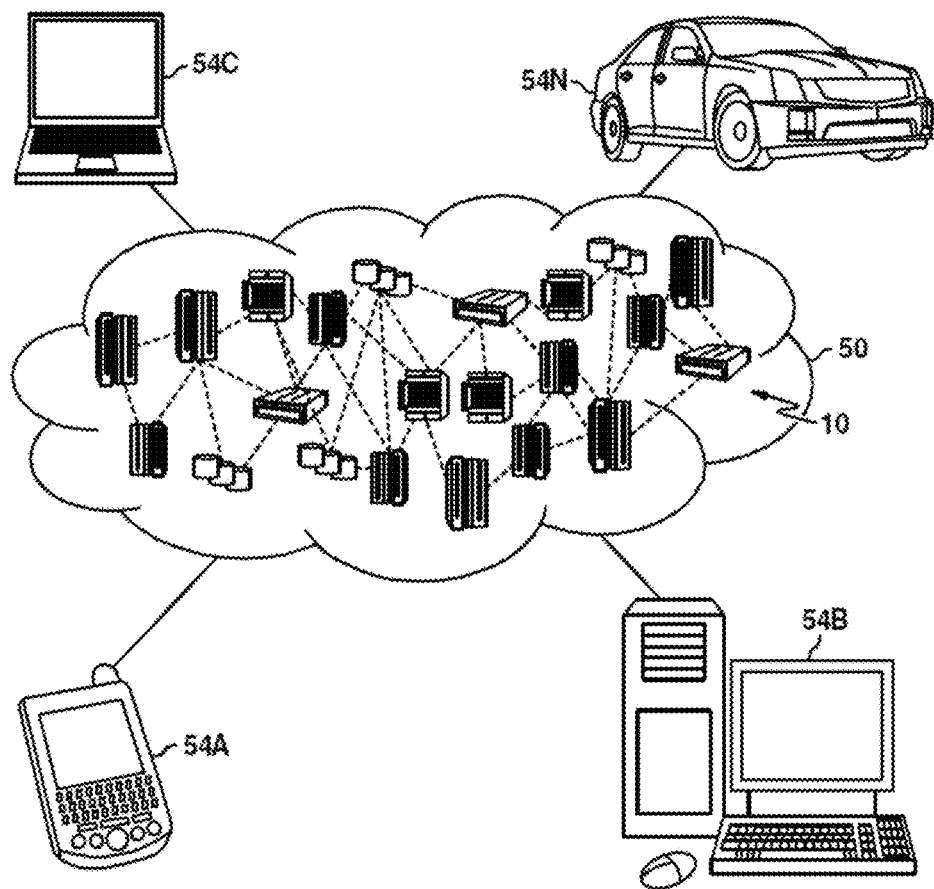
FIG. 12 depicts a cloud computing environment, in accordance with embodiments of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 12 are intended to be illustrative only and that computing nodes 10 and cloud computing environment 50 can communicate with any type of computerized device over any type of network and/or network addressable connection (e.g., using a web browser).

Figure 13:
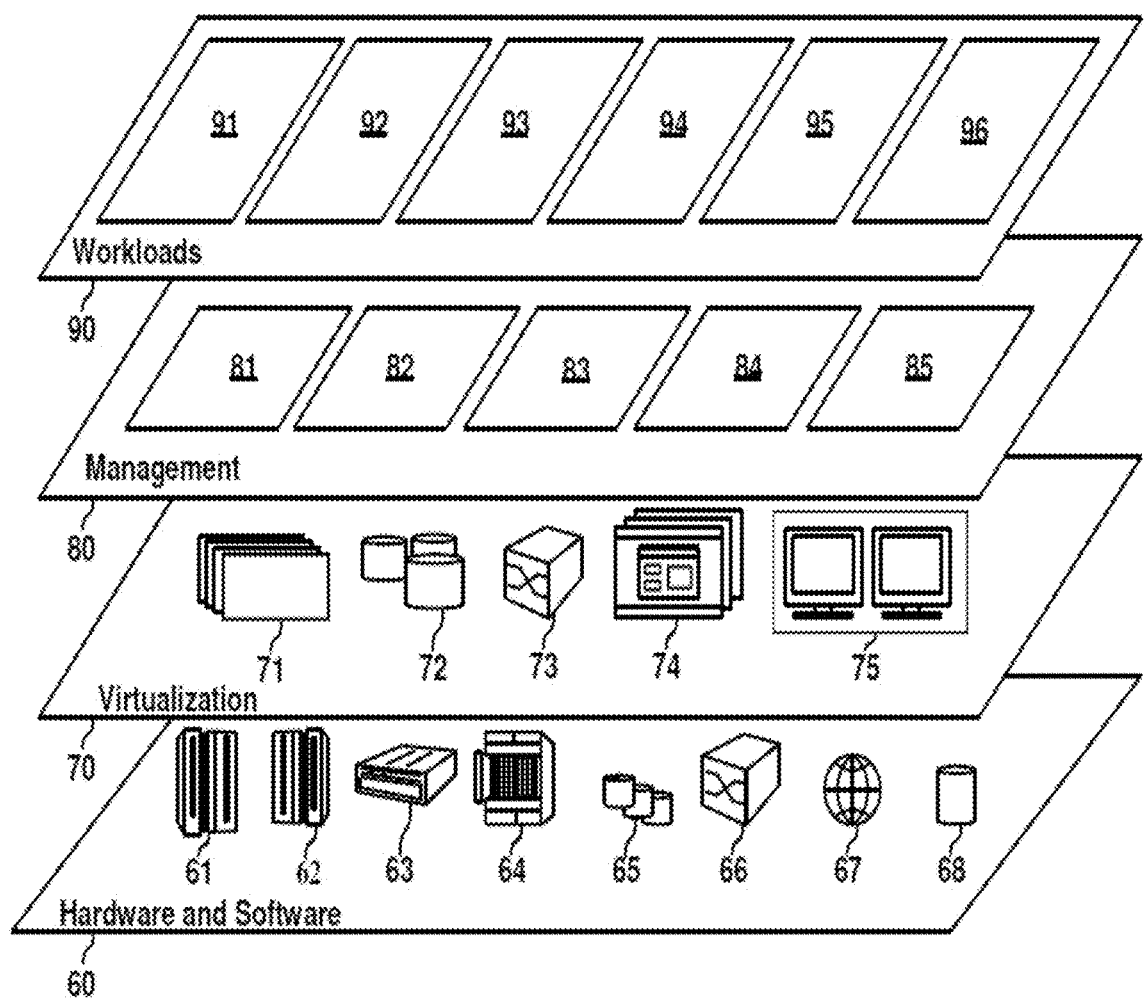
FIG. 13 depicts abstraction model layers, in accordance with embodiments of the present invention.

Referring now to FIG. 13, a set of functional abstraction layers provided by cloud computing environment 50 (see FIG. 12) are shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GUI and instant tongue sampling and diagnosis 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for assisted-learning with a portable computing device, the method comprising:
converting, by a processor of a computing system, an audio file received from the portable computing device to text;
parsing, by the processor, the text to determine that a user is requesting information regarding a place of interest, where in response to determining that the user is requesting information regarding the place of interest, obtaining, by the processor, a geographical location of the portable computing device using a plurality of sensors of the portable computing device;
activating remotely, by the processor, a camera of the portable computing device to capture one or more images of a surrounding of the user within a field of view of the camera, wherein the one or more images are received from the portable computing device over a network;
analyzing, by the processor, the one or more images using a visual recognition engine in combination with the geographical location to identify the place of interest;
determining, by the processor, that an interactive option is available for the place of interest;
instructing, by the processor, the portable computing device to audibly output the interactive option to the user along with information about the place of interest;
gathering, by the processor, social media information from a social media platform about social contacts of the user as the portable computing device is moving within an environment;
determining, by the processor, that the place of interest holds a personal significance to the user based on a prior family member visit to the place of interest; and
instructing, by the processor, the portable computing device to audibly output the personal significance to the user.

2. The method of claim 1, further comprising:
receiving, by the processor, a request that the information associated with the place of interest be audibly output in a different language that is different than a default language used to initially output the information;

translating, by the processor, the information associated with the place of interest into the different language to determine a translated information associated with the place of interest; and instructing, by the processor, the portable computing device to audibly output the translated information associated with the place of interest in the different language.

3. The method of claim 1, further comprising:

detecting, by the processor, that the place of interest is not successfully identified by the portable computing device;

providing, by the processor, feedback to a user to reposition a field of view of the portable computing device and take additional images of the surrounding area; and activating, by the processor, the camera to capture additional images.

4. The method of claim 1, further comprising:

displaying, by the processor, one or more offers or promotions relating to the interactive option associated with the place of interest; purchasing, by the processor, a ticket required to participate in the interactive option associated with the place of interest.

5. The method of claim 1, further comprising:

recording, by the processor, responses from the user received from the portable computing device;

calculating, by the processor, an interest score corresponding to an interest of the user in the place of interest, based on the responses received from the portable computing device; and providing, by the processor, information about nearby places of interest that match a type of place that has a score that exceeds a threshold score as the portable computing device is moving, without requiring a voice input from the user.

6. The method of claim 1, further comprising:

checking, by the processor, a social media profile of social contacts of the user to determine that a social contact of the user has previously participated in the interactive option associated with the place of interest, wherein determining that an interactive option is available for the place of interest utilizes a search engine of a browser.

7. The method of claim 1, further comprising:

instructing, by the processor, that the portable computing device alert the user to nearby places of interest to the place of interest that have personal significance to the user based on social media profile information.

8. A computing system, comprising:

a processor;

a memory device coupled to the processor; and a computer readable storage device coupled to the processor, wherein the storage device contains program code executable by the processor via the memory device to implement a method for assisted-learning with a portable computing device, the method comprising:

converting, by the processor, an audio file received from the portable computing device into text;

parsing, by the processor, the text to determine that a user is requesting information regarding a place of interest;

in response to determining that the user is requesting information regarding the place of interest: obtaining, by the processor, a geographical location of the portable computing device using a plurality of sensors of the portable computing device;

activating remotely, by the processor, a camera of the portable computing device to capture one or more images of a surrounding of the user within a field of view of the camera, wherein the one or more images are received from the portable computing device over a network;

analyzing, by the processor, the one or more images using a visual recognition engine in combination with the geographical location to identify the place of interest;

determining, by the processor, that an interactive option is available for the place of interest; and instructing, by the processor, the portable computing device to audibly output the interactive option to the user along with information about the place of interest;

gathering, by the processor, social media information from a social media platform about social contacts of the user as the portable computing device is moving within an environment;

determining, by the processor, that the place of interest holds a personal significance to the user based on a prior family member visit to the place of interest; and instructing, by the processor, the portable computing device to audibly output the personal significance to the user.

9. The computing system of claim 8, further comprising:

receiving, by the processor, a request that the information associated with the place of interest be audibly output in a different language that is different than a default language used to initially output the information; translating, by the processor, the information associated with the place of interest into the different language to determine a translated information associated with the place of interest; and instructing, by the processor, the portable computing device to audibly output the translated information associated with the place of interest in the different language.

10. The computing system of claim 8, further comprising:

detecting, by the processor, that the place of interest is not successfully identified by the portable computing device; providing, by the processor, feedback to a user to reposition a field of view of the portable computing device and take additional images of the surrounding area; and activating, by the processor, the camera to capture additional images.

11. The computing system of claim 8, further comprising:

displaying, by the processor, one or more offers or promotions relating to the interactive option associated with the place of interest; purchasing, by the processor, a ticket required to participate in the interactive option associated with the place of interest.

12. The computing system of claim 8, further comprising: recording, by the processor, responses from the user received from the portable computing device; calculating, by the processor, an interest score corresponding to an interest of the user in the place of interest, based on the responses received from the portable computing device; and providing, by the processor, information about nearby places of interest that match a type of place that has a score that exceeds a threshold score as the portable computing device is moving, without requiring a voice input from the user.

13. The computing system of claim 8, further comprising: checking, by the processor, a social media profile of social contacts of the user to determine that a social contact of the user has previously participated in the interactive option associated with the place of interest.

14. The computing system of claim 8, further comprising: instructing, by the processor, that the portable computing device alert the user to nearby places of interest to the place of interest that have personal significance to the user based on social media profile information.

15. A computer program product, comprising a computer readable hardware storage device storing a computer readable program code, the computer readable program code comprising an algorithm that when executed by a computer processor of a computing system implements a method for assisted-learning with a portable computing device, the method comprising:
   converting, by the processor, an audio file received from the portable computing device into text; parsing, by the processor, the text to determine that a user is requesting information regarding a place of interest; in response to determining that the user is requesting information regarding the place of interest;
   obtaining, by the processor, a geographical location of the portable computing device using a plurality of sensors of the portable computing device;
   activating remotely, by the processor, a camera of the portable computing device to capture one or more images of a surrounding of the user within a field of view of the camera, wherein the one or more images are received from the portable computing device over a network;
   analyzing, by the processor, the one or more images using a visual recognition engine in combination with the geographical location to identify the place of interest;
   determining, by the processor, that an interactive option is available for the place of interest;
   instructing, by the processor, the portable computing device to audibly output the interactive option to the user along with information about the place of interest;
   gathering, by the processor, social media information from a social media platform about social contacts of the user as the portable computing device is moving within an environment;
   determining, by the processor, that the place of interest holds a personal significance to the user based on a prior family member visit to the place of interest; and
   instructing, by the processor, the portable computing device to audibly output the personal significance to the user.

16. The computer program product of claim 15, further comprising: recording, by the processor, responses from the user received from the portable computing device; calculating, by the processor, an interest score corresponding to an interest of the user in the place of interest, based on the responses received from the portable computing device; and providing, by the processor, information about nearby places of interest that match a type of place that has a score that exceeds a threshold score as the portable computing device is moving, without requiring a voice input from the user.

17. The computer program product of claim 15, further comprising: checking, by the processor, a social media profile of social contacts of the user to determine that a social contact of the user has previously participated in the interactive option associated with the place of interest.

* * * * *